United States Patent
Leach

(10) Patent No.: US 6,793,763 B1
(45) Date of Patent: Sep. 21, 2004

(54) METHOD OF COATING AND METHOD OF BONDING

(75) Inventor: Roger John Leach, Leatherhead (GB)

(73) Assignee: Thorstone Business Management Limited, Colby (GB)

(*) Notice: Subject to any disclaimer, the term of this patent is extended or adjusted under 35 U.S.C. 154(b) by 0 days.

(21) Appl. No.: 09/807,057

(22) PCT Filed: Oct. 8, 1999

(86) PCT No.: PCT/GB99/03333

§ 371 (c)(1),
(2), (4) Date: Apr. 6, 2001

(87) PCT Pub. No.: WO00/20347

PCT Pub. Date: Apr. 13, 2000

(30) Foreign Application Priority Data

Oct. 8, 1998 (GB) .............................................. 9821991

(51) Int. Cl.[7] .................................................. C09J 5/04
(52) U.S. Cl. ...................... 156/314; 156/283; 156/320; 427/201; 427/203; 427/407.1
(58) Field of Search ................................ 427/201, 202, 427/203, 407.1; 525/934; 156/283, 314, 320

(56) References Cited

U.S. PATENT DOCUMENTS

| | | | | |
|---|---|---|---|---|
| 3,991,005 A | * | 11/1976 | Wallace | 523/129 |
| 4,004,061 A | * | 1/1977 | Creighton et al. | 156/283 |
| 4,246,368 A | * | 1/1981 | Murase | 525/934 |
| 4,752,497 A | * | 6/1988 | McConkey et al. | 427/201 |
| 5,300,174 A | * | 4/1994 | Leach et al. | 156/283 |
| 5,530,036 A | * | 6/1996 | Sano et al. | 522/79 |
| 6,277,917 B1 | * | 8/2001 | Jurgetz et al. | 525/934 |

* cited by examiner

Primary Examiner—Jeff H. Aftergut
Assistant Examiner—John L. Goff
(74) Attorney, Agent, or Firm—Davis & Bujold, P.L.L.C.

(57) ABSTRACT

Coating (1,2) on a glass substrate (3) are formed by laying down layers of different thermosetting materials one upon the other in powder form on surface (4). The powder of transparent coating 1) has a higher-cure rate than that of color coating (2) so that when heat is applied, coating (2) remains in the melt condition while the coating (1) hardens, to bond with and enable rolling out onto coating (1), as well as bonding with a backing (5). Materials of different cure-rates are also used for bonding substrates together by bringing the two materials together while one is partly-cured and the other in the melt condition.

11 Claims, 2 Drawing Sheets

US 6,793,763 B1

METHOD OF COATING AND METHOD OF BONDING

FIELD OF THE INVENTION

This invention relates to coatings.

BACKGROUND OF THE INVENTION

It is known from GB-A-2207089 that powder coatings may be used for bonding two surfaces together by exploiting the melt phase to wet out the surfaces prior to effecting full cure to establish the bond. In normal circumstances, especially when the bond is required between sheets or other large-area surfaces, it is found necessary to employ nip rolling or other pressure-applying means (mechanical or vacuum) to enable a good laminate to be produced. Application of pressure, however, tends to press out the melted powder, and this can be of significant disadvantage where the powder is to provide a coloured or opaque coating to a glass or other transparent or translucent substrate. The applied pressure may result in thinning or pressing out of the melt such that on curing there is no solidity and uniformity of coating-colour or -opacity and the backing to the coating shows through. It is one of the objects of the present invention to provide a method of bonding by which such problems can be avoided.

SUMMARY OF THE INVENTION

According to one aspect of the present invention there is provided a method of coating wherein different thermosetting materials are laid down in powder form one upon the other on a substrate, and heat is applied to melt and fuse the powders into respective coatings bonded together on the substrate.

The powders may have different rates of cure from one another, and in these circumstances, the higher cure-rate powder may be laid down as a first layer on the substrate, and the lower cure-rate powder may be laid down as a second layer on the first layer. The lower and higher cure-rate materials may be, fox example, epoxy, polyester, or acrylic materials. Powder coatings can be produced with a variety of cure-rate windows so as to give markedly different rates of cure. The powders are commonly characterised in this regard as 'high-baker' ('low cure-rate') or 'low-bake' ('high cure-rate'); the terms 'high-bake ' and 'low cure-rate' distinguish from the terms 'low-bake' and 'high cure-rate' in that a 'high-bake' or 'low cure-rate' material takes longer to cure at any given temperature than a 'low-bake' or 'high cure-rate' material.

With the method of the invention it is readily possible to obtain a good laminate without the disadvantage of thinning or pressing out of the melt, and in particular to avoid show-through where colour or opacity is required with a transparent or translucent substrate. In the latter respect, and using materials of different cure-rates, the higher cure-rate material may provide a coating with colour or opacity on a transparent or translucent substrate and the lower cure-rate material may be applied to it while the higher cure-rate material is in its initial un-cured state or at least still not fully cured. When this latter material hardens to form a solid and uniform coating, the lower cure-rate material is still in a state to wet the higher cure-rate coating and the backing surface that is pressed onto it, until curing is complete. Even if the pressure applied to the backing to complete the laminate during curing of the lower cure-rate material, presses out that material to be very thin, the already-cured solid-colour or opaque coating visible through the substrate, remains unaffected.

According to another aspect of the present invention there is provided a method of bonding two surfaces together wherein the bond is effected using two bonding materials that have different cure-rates, the material of lower cure-rate being applied to the material of higher cure-rate while this latter material is in the uncured state, prior to curing of both.

BRIEF DESCRIPTION OF THE DRAWINGS

Methods of coating and bonding in accordance with the present invention will now be described, by way of example, with reference to the accompanying drawings, in which.

DETAILED DESCRIPTION OF THE PREFERRED EMBODIMENTS

Figure 1:
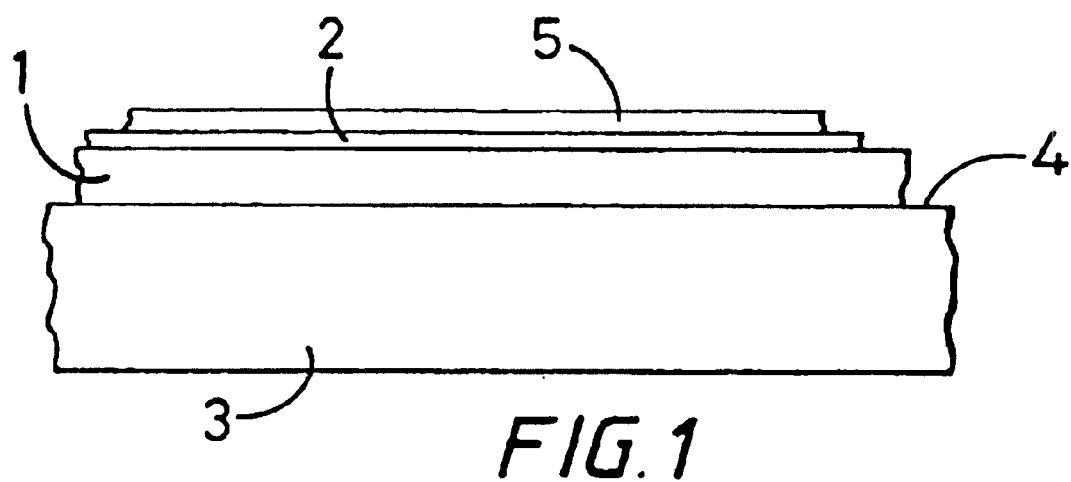
FIG. 1 is illustrative of a laminate manufactured according to the method of the invention.

Referring to FIG. 1, two coats 1 and 2 of thermally-curing powder are applied one upon the other on a substrate 3. The base coat 1 is a low-bake powder (high cure-rate) and is applied to a surface 4 of the substrate 3. While the powder of the coat 1 is still uncured, the second coat 2, which is of a higher-bake cure-window (lower cure-rate), is deposited on it. Heat is then applied to melt both coats 1 and 2, the base coat 1 softening and then hardening first to effect a good bond with the surface 4. The second coat 2 remains wet to ensure good bonding between the cured coat 1 and a backing 5 that is pressed, for example by a nip roller (not shown), onto the coating 2. The applied pressure may press out the melted powder of the coat 2 until curing of the coat 2 is complete, but the first-hardened coat 1 remains substantially unaffected and continuous.

Heat is not applied to melt or cure the low- and high-bake powders until both coats 1 and 2 have been laid down in powder form one upon the other. However, it is preferable to warm the substrate 3 so as to keep the surface 4 free from condensation, but this is not generally intended to affect the condition of the powder deposited on it to any significant extent. The fact that one layer of powder is deposited on the other before heat is applied for melting to take place, is believed to improve the bond between the two coats 1 and 2 because of inevitable intermingling of the powders to some degree, at the interface of the two layers.

Figure 2:
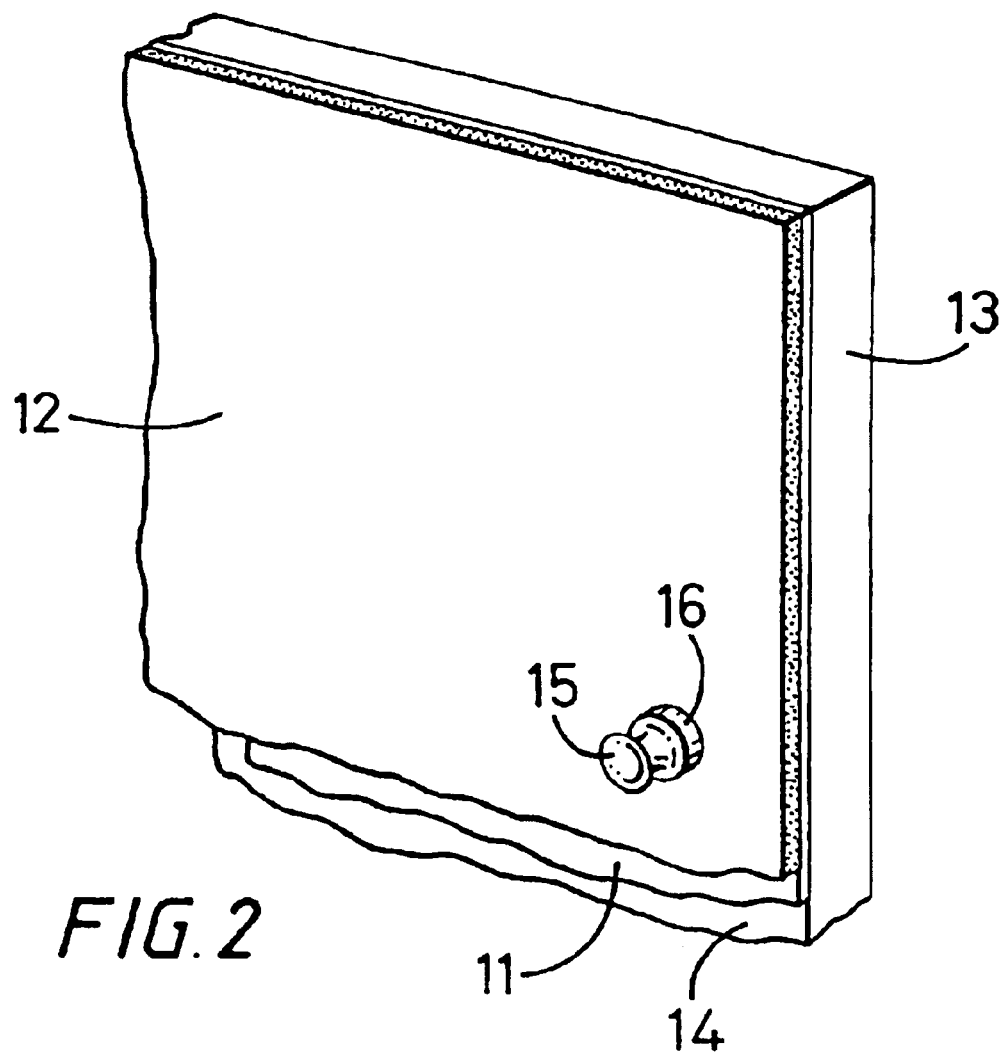
FIG. 2 is illustrative of a laminate door-panel manufactured according to the method of the invention.

Thermosetting powders having different cure-rates may be used according to the invention for the straightforward bonding of one item to another, for example as illustrated in FIG. 2.

Referring to FIG. 2, two 'paint' coats 11 and 12 (corresponding to coats 1 and 2 respectively) which are applied to a door panel 13 to protect and give colour to its surface 14, also serve to bond an article such as, in this instance, a door handle 15, to the panel 13. The panel is manufactured by first depositing on the surface 14 (electrostatically or by gravity feed) a layer of low-bake powder for the coat 11, and then a layer of high-bake powder on the first powder layer, for the coat 12. Heat is then applied to melt both powder layers and cure the first layer into the coat 11. While the second powder layer is still in the melt phase after the first layer has cured into (or is in an advanced stage towards) the hardened coat 11, the base 16 of the door handle 15 is pressed hard onto the melt and held there until the second layer has cured into the hardened coat 12.

The second powder layer acts to wet out the bond between the coat 11 and the base 16 and ensure a firm bond. It may provide a clear, protective covering to the coat 11 which will normally be coloured, and may have afford a gloss or satin finish to the door panel 13.

Resistance to runs and surface imperfections of coatings may be avoided using the method of the invention. The application of first surface colouring, 'painting' is assisted in this process by the ability to apply different colours or thicker coatings in a one-oven line. Conventionally each coat is cured before the application of a second coat, whereas with the technique of the present invention two or more coats of differing or similar colour and/or clear (possibly gloss) coat may be applied before any curing takes place. The coats are applied as successive powder layers from, for example, separate guns, without any steps being taken to cure one layer before application of the other; once the layers of powder have been deposited, heat is applied to cure them all together in the one step. Each successive powder layer laid down has a slower cure-rate than the one preceding it and this ensures that during the resultant progressive cure, a finish without runs or orange peel effect is achieved. If the final coat is clear gloss, a particularly high quality finish is obtained.

The invention may be readily applied to the formation of solid, coloured or clear laminates. In particular, a base material may be coated by the adhesion of another similar or differing flexible material. For example, a laminate may be brought together by tightly winding a foil or plastics element upon a pipe or tube, or if a planar sheet is involved by using a nip roller or press during the cure phase. Low-bake powder is applied to the base component and then re-coated with a higher-bake powder before curing is commenced. When the cure is for example, about 70% complete, the low-bake powder is hard, but the high-bake is still soft to allow foil(s) or plastics element(s) to be applied with good adhesion.

Where powder coatings are deposited on glass or metal substrates it is usually necessary to promote the bond with the glass or metal surface by use of an adhesion promoter such as a silane. Rather than depositing a silane film on the substrate as is conventional, it is possible however, to include the silane in the coating powder. More particularly, the silane can be involved in the initial mix used for manufacture of the powder, and it has been found advantageous to include acid as well where glass is involved. In the latter respect, the acid is included with the object of providing appropriate pH-modification of the glass surface, to enable optimum action of the silane.

Two powder-coated panels formed using coating powders that include a silane and an acid as referred to above from manufacture, will now be described with reference to FIGS. 3 and 4.

Figure 3:
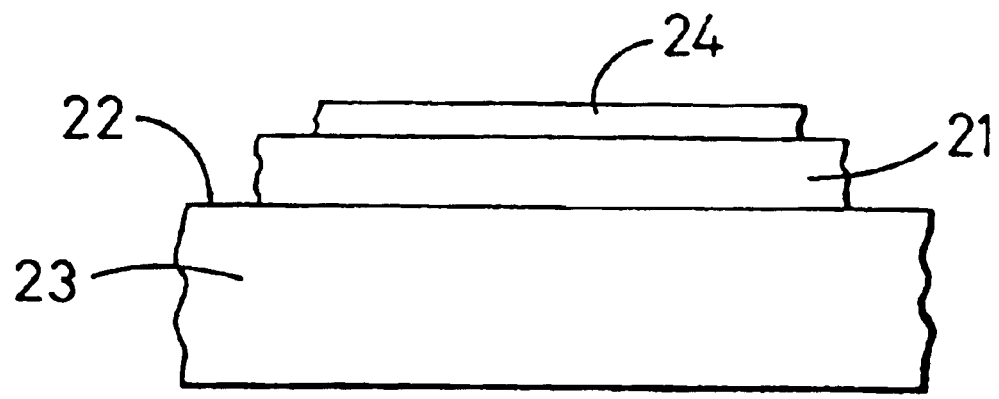
FIGS. 3 and 4 are illustrative of the manufacture of further laminate panels, according to the invention.

Referring to FIG. 3, a thermosetting epoxy-based powder is in this case deposited electrostatically as a layer 21 on a surface 22 of a substrate 23 of toughened glass. The powder includes, from manufacture, silane and acid components as referred to above, as well as pigmentation. Heat to melt and cure the powder of layer 21 is applied only after a layer 24 of polyethylene powder has been deposited electrostatically on the layer 21.

The applied heat causes both powder layers 21 and 24 to melt. The acid in the melted layer 21 is activated to modify the pH at the surface 22 and initiate the action of the silane to provide the conditions for good adhesion with the surface 22. The melting of the polyethylene layer 24 on the other hand cause a degree of intermixing with the melted epoxy layer 21 at their interface, so that on hardening of the layer 24 and curing of the layer 21 there is cohesion between them in a good physical bond.

Figure 4:
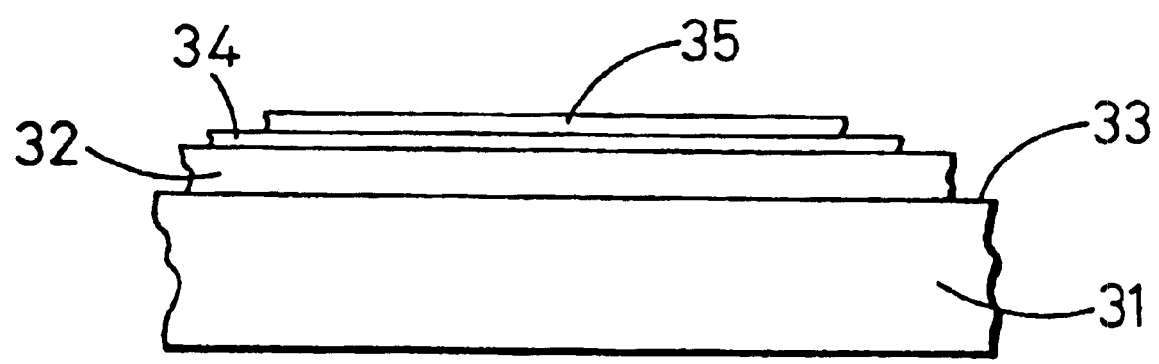

Referring to FIG. 4, the panel in this case involves a substrate 31 of annealed glass and a transparent polyester-based powder deposited electrostatically as a layer 32 on a surface 33 of the substrate 31. The powder of layer 32 includes, from manufacture, silane and acid components as referred to above, and a layer 34 of another polyester powder not including such components, is deposited electrostatically on the layer 32. The powder of layer 34 includes pigmentation.

Heat is applied to melt and cure the powders of both layers 32 and 34. During the melt phase of the powder of layer 32, its acid component is activated to modify the pH at the surface 33 and initiate the action of the silane to provide the conditions for good adhesion with that surface. Furthermore, there is cross-linking at the interface between the two layers 32 and 34 so that when the powders cure there is a strong chemical bond between the resultant coatings and between them and the substrate 31.

It is desirable that the layer 32 cures faster than the layer 34 so that while it is gelling a nip roller can be used to press down and smooth out the layer 34 for even cover of the coating of layer 32. Furthermore, a water-protective foil 35 is laid down in contact with the layer 34 while still in the melt phase so as to be bonded firmly to it on cure of this layer.

A laminate comprising two layers of glass or plastics bonded together to show the same or similar colours viewed from either side, can be manufactured by the application of a fast-curing powder containing pigmentation to one glass or plastics layer and a slow-curing powder either on top of that or to the other glass or plastics layer; the slow-cure powder provides a clear coat. Both components are then heated to where the low-bake powder becomes substantially hard but the high-bake coat is still wet, the two components being nip rolled or pressed together as curing of both coats is completed and the resultant laminate formed.

If different colours are to show from the two sides of the laminate, low-bake powder containing a respective pigment is deposited on each glass or plastics component, and high-bake powder on top of one (or possibly both) of the low-bake layers. During curing, the low-bake primary coats on both components cure to hard but are not fully cross-linked (for example about 70% cured) while the high-bake powder is still soft. In this condition the two components are nipped together and then-fully cured; the applied pressure enables gas to be pressed from the laminate. The cohering high-bake powder is preferably, though not necessarily, such as to provide a clear coat.

Although the substrate and other components used in the methods as described above are generally non-porous, the invention is applicable where the components are of a porous nature. In this respect, a primary coat of low-bake powder may be applied to a porous (or other) substrate and after over-coating with a high-bake powder, cured to about 70%. A second component is coated with a high-bake powder and while this coating and the high-bake coating of the first component remain soft, the two components are pressed together for completion of the curing process. The advantage of this method is that the press stage is undertaken when the primary film is continuous and substantially hard so as to ensure that there is no bleed through the porous material from the adhesive layer, during the pressing phase.

The use of powders with differing cure-rates optimises cross polymerisation of the two coatings; the dual-cure process enables processing to take place in a perfect gas-free and clean environment right through to full cure.

The two coatings may also be two coats of catalyst or ultra-violet curing adhesives with different cure windows. When catalyst adhesives (for example those sold under the trade marks ARALDITE and ARALDITE RAPID) or resins are used, the two cure-rates may be accommodated chemically, allowing for more control of the adhesive layer than hitherto. Conventionally, one-coat application of an adhesive is usually advised. The two components have to be brought together at an early cure time to ensure that the adhesives wet out both surfaces, and then held to full cure, often leading to the bond line being pressed out.

With the method of the present invention, a coat of adhesive is applied to both components, one a fast-cure adhesive and the other a slower-cure adhesive that is formulated to be hard, but not fully cross-linked, when the one is still soft. The faster-cure adhesive delivers a substantially viscose coating that resists the pressure used to bring the surfaces together by nip roller, or press or clamp. The slower-cure adhesive wets out the second surface and offers an optimum bond.

In a process known as the 'Unilam' process, a resin adhesive (such as acrylic, catalyst activated resin) is used for bonding two sheets of glass together. The two glass sheets are held upright spaced apart from one another by a gasket while the resin is poured into the space between them. Although the resulting bond is generally acceptable, the hydraulic pressure of the resin tends to bow the sheets apart in the middle, unsatisfactorily. The resulting product has a restricted commercial use because of the variation in gauge caused by the bowing and the influence this has on the density, and therefore perceived colour, when viewing the laminate.

With the present invention, however, these limitations can be eliminated to a substantial extent. In this respect, for example, two plastics or glass sheets used to form the laminate are first coated with resin while laid horizontally. A fast-cure resin is applied to a first of the sheets to form a distancing medium, whilst a slow-cure resin is used to wet out the surface of the second sheet to ensure a good bond with the coating of the first sheet when the two sheets are brought together under a nip roller or press. The resultant laminate is unaffected by the inconsistency-of-gauge problems that currently limit the 'Unilam' products.

As an alternative method according to the invention, primary coats of fast-cure resin are poured onto the surfaces of both glass or plastics sheets while the sheets are retained horizontal on a tilt table. The resin flows out flat on each sheet and begins to cure. As the primary coats begin to harden just beyond the gel stage, the table is tilted to vertical and the two sheets are brought together with the required spacing for the laminate, using an edge gasket. A third layer of resin is then introduced by pouring into the gap between the hardening coats on the two sheets; the sheets are held vertical to degas the resin while pouring takes place. Once the catalysts have substantially cured the primary coats and the poured-resin layer is gelling, the two sheets are returned to the horizontal and the laminate passed through nip rollers squeezing out the poured-layer to give a consistent gauge.

Methods in accordance with the invention, using the differential cure-rate technique, may be applied to the manufacture of solar and other panels where an interlayer is to be inserted, for example, to provide a continuous electrically insulating, conducting or other interface between successive layers of the laminate. By sandwiching aluminium, copper, silicon chips, silicon crystals or other items between low-bake layers, these can then be bonded to outer, substrate layers to make up the laminate, using high-bake material to effect the bond. Similarly, photographic or other images may be inserted into the laminate as a means of decoration, publicity or other purposes.

I claim:

1. A method of coating wherein two different thermosetting materials are laid down in powder form as two successive layers one upon the other on a substrate, the powder of the first of the two layers laid down having a higher rate of cure than the powder of the second layer laid down, and the powder of the second layer being deposited on the powder of the first layer, and wherein heat is applied to the two layers, the heat being applied only following deposit of the powder of the second layer on the powder of the first layer while the two layers are both in the powder form, and the heat being applied to both powder layers to melt and fuse them into respective coatings bonded together on the substrate and cure the first layer before cure of the second layer.

2. The method according to claim 1, wherein while the second layer is still in the melt phase and the first layer is substantially cured, an item to be bonded to the substrate is brought into contact with the second layer and held there until the second layer cures.

3. The method according to claim 1, wherein at least one of the powders includes pigmentation.

4. The method according to claim 1, wherein one of the powder when fused is transparent.

5. The method according to claim 2, wherein said item is a second substrate, said second substrate carries a partly-cured layer of thermosetting powder, and the first and second substrates are brought together with the partly-cured layer of the second substrate in contact with the second layer of the first substrate, said contact being made while the second layer of the first substrate is in a soft state prior to curing, and wherein said contact is maintained while heat is applied to both substrates to cure said partly-cured layer and the second layer of the first substrate.

6. The method according to claim 1, wherein the powder of the first layer is an epoxy-based powder and the powder of the second layer is of polyethylene.

7. A method according to claim 6 wherein the powder of the first layer includes an adhesion-promoting component.

8. The method according to claim 6, wherein the powder of the first layer includes an acid component.

9. A method of coating a substrate with two different thermosetting materials which are deposited in powder form as two successive layers one upon the other on the substrate with the powder of the first successive layer having a higher rate of cure than the powder of the second successive layer, the method comprising the step of:

depositing the powder of the second successive layer on the powder of the first successive layer;

applying heat to the first and second successive layers only following deposit of the second successive layer on the powder of the first successive layer while the two layers are both in the powder form;

heating the first and second successive powder layers to melt and fuse first and second successive powder layers into respective coatings bonded together with one another; and using a polyester-based powder as the powder of the first successive layer and a different polyester powder as the powder of the second successive layer.

10. The method according to claim 9, wherein the powder of the first layer includes an adhesion-promoting component.

11. The method according to claim 9, wherein the powder of the first layer includes an acid component.

* * * * *